US012007868B2

United States Patent
Badr et al.

(10) Patent No.: US 12,007,868 B2
(45) Date of Patent: Jun. 11, 2024

(54) GENERATING ACTION ELEMENTS SUGGESTING CONTENT FOR ONGOING TASKS

(71) Applicant: Google LLC, Mountain View, CA (US)

(72) Inventors: Ibrahim Badr, Zurich (CH); Imran R. Mansuri, Sunnyvale, CA (US); Sari Onaissi, Union City, CA (US); InHan Kang, Santa Clara, CA (US); Wenqiong Guo, Palo Alto, CA (US); Anner Kushnir, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 217 days.

(21) Appl. No.: 17/368,155

(22) Filed: Jul. 6, 2021

(65) Prior Publication Data
US 2023/0007980 A1    Jan. 12, 2023

(51) Int. Cl.
*G06F 11/34* (2006.01)
*G06F 16/906* (2019.01)
*G06F 16/9535* (2019.01)
*G06N 20/00* (2019.01)

(52) U.S. Cl.
CPC ........ *G06F 11/3438* (2013.01); *G06F 16/906* (2019.01); *G06F 16/9535* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 10,810,532 B2 * | 10/2020 | Avrahami | G06Q 10/06313 |
| 2018/0027082 A1 | 1/2018 | Choudhary et al. | |
| 2018/0315103 A1 * | 11/2018 | Lakshminarayan | G06Q 30/06 |
| 2019/0149626 A1 * | 5/2019 | Shah | H04L 67/53 |
| | | | 706/12 |
| 2020/0110623 A1 * | 4/2020 | Vangala | G06F 3/0483 |
| 2020/0159862 A1 | 5/2020 | Kleiner et al. | |

FOREIGN PATENT DOCUMENTS

| | | |
|---|---|---|
| CN | 106530058 | 3/2017 |
| CN | 106682925 | 5/2017 |
| JP | 2007/179185 | 7/2007 |

OTHER PUBLICATIONS

Extended European Search Report Corresponding to Application 22180785.2 dated Nov. 30, 2022.

* cited by examiner

*Primary Examiner* — Ariel Mercado
(74) *Attorney, Agent, or Firm* — DORITY & MANNING P.A.

(57) ABSTRACT

A computing system and method that can be used to surface a selectable action element for at least one ongoing task. In particular, the present disclosure provides a general pipeline to identify potential tasks that a user has an ongoing interest in or has not yet completed so that a suggestion of a content item can be made to further advance an identified user's task. This pipeline can incorporate probabilistic transition graphs, machine-learned models, and/or historical data to determine the relevance and completion of tasks that a user may desire to continue acting upon.

19 Claims, 9 Drawing Sheets

GENERATING ACTION ELEMENTS SUGGESTING CONTENT FOR ONGOING TASKS

FIELD

The present disclosure relates generally to identifying ongoing tasks associated with a user. More particularly, the present disclosure relates to generating action elements suggesting content for ongoing tasks identified on the basis of historical user web browsing data.

BACKGROUND

A web browser application ("browser") can fetch content from a web server and display it on a user's device. A user can input a uniform resource locator (URL) so that the browser can retrieve data (e.g., content) associated with the URL (e.g., by leveraging a hypertext transfer protocol to communicate with the web server).

In some instances, the communication between the browser and the web server can be encrypted for purposes of privacy and security. Once a browser has retrieved a web page, the browser's rendering engine can display it on the user's device, including images and video formats supported by the browser. Most browsers can use an internal cache of web page resources to improve loading times for subsequent visits to the same page. The cache can store many items, such as large images, so they do not need to be downloaded from the server again.

Generating personalized search queries is a process of leveraging web browsing technology, to provide personalized content for a user. Some standard query personalization techniques rely on aggregated user information such as common search queries. However, existing approaches to not attempt determine particular tasks a particular user may have been conducting.

While progress has been made in the field of personalized search queries, existing approaches are typically limited to a user leveraging a preexisting search bar for a single, isolated queries and do not consider alternatives or overarching purpose to any given user search.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for task-specific action element generation. The method comprises a computing system obtaining historical user data descriptive of historical user actions taken in one or more past user online sessions. The historical user data has been annotated with annotations descriptive of attributes of content associated with the user actions. The method comprises the computing system identifying one or more tasks from the historical user data. The method comprises the computing system determining a suggested content item for each of the one or more ongoing tasks. The method comprises the computing system surfacing for display to the user a selectable action element for at least one ongoing task. The selectable action element is configured to provide access to at least one suggested content item for the at least one ongoing task.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
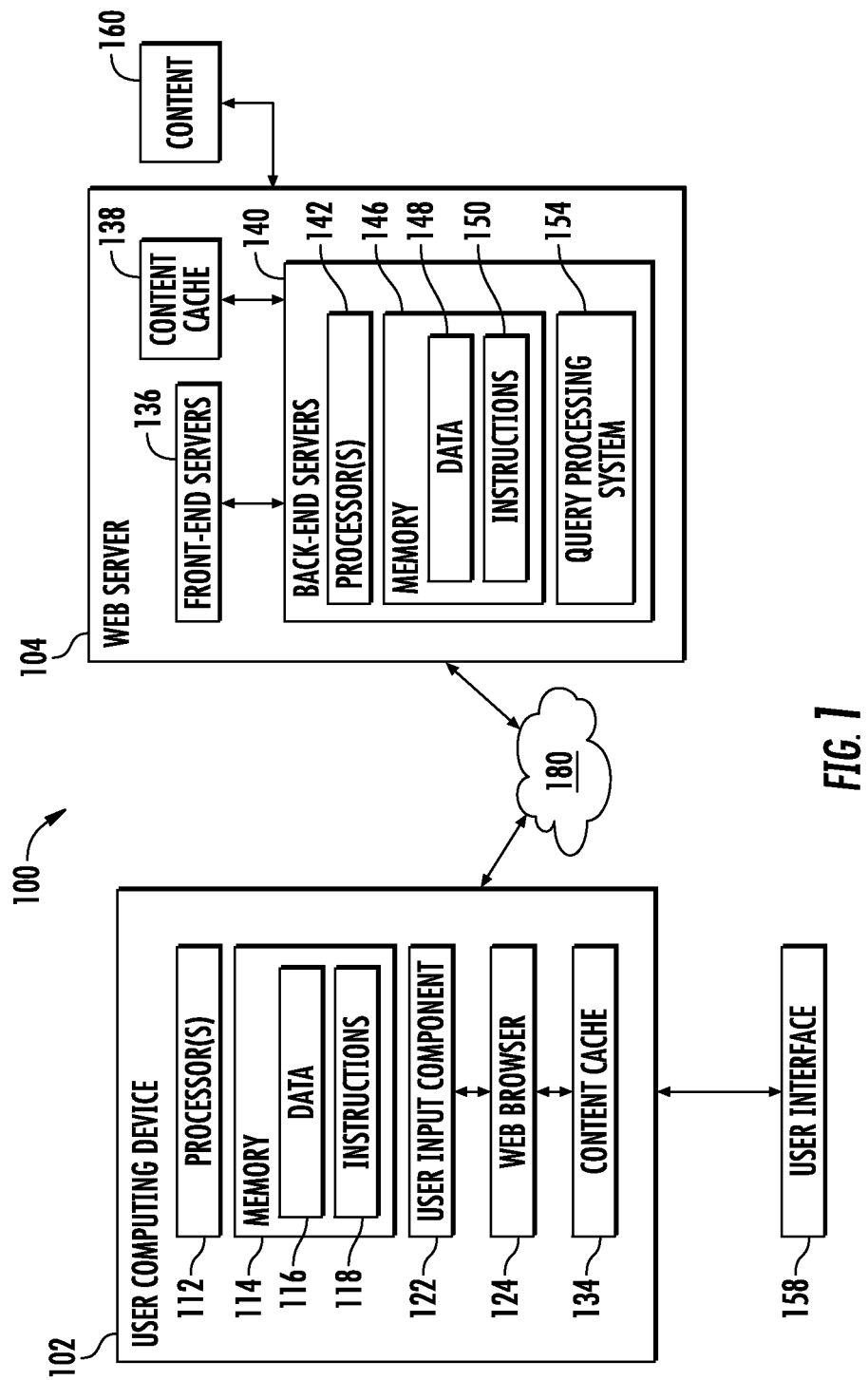
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to a computing system and method that can be used to surface a selectable action element for at least one ongoing task, for example, an action element configured to provide access to at least one suggested content item associated with an ongoing task. In particular, the present disclosure provides a general pipeline to identify potential tasks that a user has an ongoing interest in or has not yet completed so that a suggestion of a content item can be made to further advance an identified user's task. This pipeline can incorporate probabilistic transition graphs, machine-learned models, and/or historical data to determine the relevance and completion of tasks that a user may desire to continue acting upon.

More particularly, an example computing system can identify ongoing tasks. For example, the computing system could identify ongoing tasks by analyzing historical user data to infer what task the user may engage in in the future. By leveraging what the user has already done in the past, the computing system can determine overarching categories of activity from which the computing system can evaluate a pipeline of predicted steps that a user is most likely to take regarding the identified task. For example, if the computing system identifies that a user has engaged in a shopping activity, the computing system can generate (e.g., with a probabilistic transition graph, machine-learned model, etc.) a most likely pipeline for shopping (e.g., inspiration, discovery, consideration, validation, purchase, post purchase) and/or assess a user status or position along such a pipeline. Thus, the computing system can leverage the historical user data to determine which stage in the pipeline the user is most likely to engage in next.

In some implementations, the computing system can optimize the pipeline of activity that a user might engage in to complete a particular task. The computing system can optimize the pipeline of activity that a user might engage in by predicting the next most likely step that the user could take and identifying relevant content. The relevant content can then be presented to the user so that the user does not need to personally engage in manually searching for the content. The relevant content can be presented to the user by surfacing selectable action elements. The selectable action elements can be displayed in a specific dashboard that a user can navigate to view multiple tasks that the computing system has determined. As an example, a user can interact with the specialized dashboard to indicate which task of the multiple available tasks the user desires to interface with. Furthermore, the selectable action element can be overlayed on a current browsing session the user is engaging in to provide a suggestion that the user can interact with to propel a user into furthering an ongoing task.

Example methods for surfacing a selectable action element for at least one ongoing task can include obtaining historical user data. In particular, the historical user data can be descriptive of historical user actions taken in one or more past user online sessions. As an example, the historical user data can be annotated with annotations. In particular, the annotations can be descriptive of attributes of content associated with the user actions. For example, the computing system can obtain historical user data and annotate that some portion of the historical data was related to searching headphones or purchasing headphones. Even more particularly, the annotations can be based on metadata associated with the content.

One or more ongoing tasks can be identified by the computing system. The one or more ongoing tasks can be identified based on historical user data (e.g., using historical user web browsing data). The ongoing tasks can be discrete tasks (e.g., purchasing an item, planning a vacation, etc.). The ongoing tasks can be continuous tasks (e.g., cooking, movies to watch, etc.). For example, the computing system can identify a discrete task such as purchasing a set of headphones.

One or more suggested content items can be determined by the computing system. The one or more suggested content items can be determined for each of the one or more ongoing tasks. For example, if a user is undergoing a task to buy a set of headphones, the computing system can suggest content items related to purchasing headphones. For instance, the computing system can suggest content items such as a buying guide to purchasing headphones, reviews of headphones the user has viewed according to historical browser data, various headphones themselves, suggested search queries, comparison guides, or related products (e.g., attachable microphone, headphone case, etc.). The suggested content items can change depending on the identified user ongoing task. In particular, the suggested content items can include adding content to a user data bank (e.g., a list). For instance, if the computing system instead determines that the user is undergoing an interest in cooking the suggested content items could instead be recipes that the user can add to a user recipe book in combination with other suggested content (e.g., cooking appliances, grocery list, grocery store location, etc.). As another example, if the computing system determines that the user is interested in movies, the suggested content items could include movies to add to a watch list in combination with other suggested content (e.g., movie reviews, related movies, etc.).

A selectable action element can be surfaced for display to the user. The selectable action element can be related to the at least one ongoing task. In particular, the selectable action element can be configured to provide access to at least one suggested content item for the at least one ongoing task. The selectable action element can include an image related to the ongoing task the action element relates to. As an example, a selectable action element related to a user trying to buy headphones can include an image of headphones on the action element itself.

In some implementations, historical user actions can be extracted across a plurality of web pages. For instance, historical user actions can be extracted from a plurality of web pages that a user has opened regardless of if the web pages were closed after being opened. Furthermore, the historical user actions can be extracted across multiple web browser sessions. Particularly, the historical user actions can be extracted from multiple instances of a user initiating a search using a web browser, closing the web browser for some amount of time and then returning to the web browser and initiating another search (e.g., a different search). As an example, the historical user actions can be extracted for web browser sessions for a predetermined amount of time. Specifically, the historical user actions can be extracted within the 30 days prior to extracting the historical user actions. Web browser sessions can correspond to: discrete instantiations of a web browser application (e.g., one session corresponds to loading and unloading of an instantiation of the web browser application into device memory); use of a web browser application over a period of time (e.g., each different day of use of a web browser application corresponds to one session); use of a web browser during a log in period for a given user; different tabs within a web browser; and/or other segmentations of use of a browser application over time.

In some implementations, one or more ongoing tasks can be identified by the computing system. Furthermore, the one or more ongoing tasks from the historical user data can be annotated. The historical user data can be annotated descriptive of attributes of content associated with the user actions. As an example, historical user data indicating a user search for best headphones of 2021 can be annotated to be described as relating to purchasing headphones. In particular, the annotated historical user data can be arranged into a plurality of clusters. Furthermore, one or more ongoing tasks can be identified from the historical user data based at least in part on the plurality of clusters. In one example, identifying one or more ongoing tasks can include performing an edge threshold algorithm to identify one or more primary clusters of the plurality of clusters. Examples of "edges" or "dimensions" by which product image searches might match include recognition-derived attributes such as category (e.g., "headphones"), attributes (e.g., "noise cancelling", "gaming", etc.), or other semantic dimensions and/or visual attributes such as "dark with light accents," "light accents are thin lines composing 40% of the overall color space," etc., including machine-generated visual attributes such as machine-extracted visual features or machine-generated visual embeddings.

In some implementations, one or more ongoing tasks from the historical user data can be identified. In particular, the historical user data can be input into a machine learned model. Even more particularly, the machine learned model can generate one or more ongoing tasks from the historical user data that is input.

In some implementations, identifying one or more ongoing tasks from the historical user data can be based at least in part on a relevance score. In particular, the relevance score can be based at least in part on a timestamp associated with the historical user data. Even more particularly, content comprising a higher relevance score can be weighted more heavily than content with a lower relevance score. For instance, the relevance score for a web browsing search conducted within the previous 24 hours can be higher than the relevance score for a web browsing search conducted 30 days prior. Furthermore, the timestamp can be associated with a duration of time spent browsing a particular content. In particular, the relevance score can be based at least in part on the duration of time spent browsing a particular content. For instance, the relevance score may be higher for content that was browsed for a longer period of time. Additionally, relevance score can be based at least in part on repetition of web browsing searches. For instance, the relevance score may be higher for content that was browsed repeatedly. Even more particularly, a relevance score may be required to meet a threshold of relevance in order to qualify the associated content for identification of a potential user task.

In some implementations, identifying one or more ongoing tasks from the historical user data can include generating a probability distribution. In particular, the probability distribution can include a set of next step intent (i.e., intent to perform an action) based at least in part on historical user data. Even more particularly, the historical user data can be extracted from a plurality of users. Furthermore, a suggested next step can be identified based at least in part on a completion metric. In particular, identifying one or more ongoing tasks from the historical user data can include identifying a suggested next step. Even more particularly, suggesting a next step can be based in part on the completion metric, wherein the completion metric indicates a user's status with regard to completing predetermined checkpoints associated with one or more ongoing tasks. Even more particularly, the predetermined checkpoints can indicate what information the user has already consumed. For instance, the suggested next step identified can be different depending on how complete a task a user is undergoing is or what checkpoints the user has already completed. As an example, if a user is trying to buy headphones, if the user is in a preliminary stage (e.g., the user has not hit any checkpoints) the user may be assisted the most by viewing buying guides. On the other hand, if the user is in a later stage of the process (e.g., the user has already hit multiple checkpoints such as viewing a buying guide) the user may be more interested in reviews of particular headphones. Furthermore, historical data may indicate a strong user interest in completing a task, but the user may have actually recently completed this task, thus no more content can be surfaced to the user with regard to the completed task. In particular, the completion metric can be based at least in part on a URL associated with at least one predetermined checkpoint. Even more particularly, the URL associated with at least one predetermined checkpoint can be associated with the one or more ongoing tasks. As an example, the URL from a purchase confirmation web page can signal that a user has already purchased a set of headphones and has completed this task. Thus, in response the computing system can remove the headphones from potential ongoing tasks that the computing system has determined.

In some implementations, identifying one or more ongoing tasks from the historical user data can include accessing a continually updated probabilistic transition graph that describes a predicted pipeline of steps the user may take to complete a task. Particularly, the probabilistic transition graph can identify next step intent for an identified task. In particular, the probabilistic transition graph can be based on a plurality of historical user tasks, wherein the plurality of historical user tasks can be across a plurality of different users. Even more particularly, the probabilistic transition graph can reflect different next step intent within an ongoing task needs for different categories of tasks. For instance, even within the shopping task there may exist distinctions in the probabilistic transition graph depending on the product (e.g., TV vs mobile phone vs sofa). Specifically, a unique distribution can be generated per task category and subcategory. Based on the probabilistic transition graph the computing system can identify a next step intent for the one or more ongoing tasks. In particular, the probabilistic transition graph can comprise a hierarchical representation of the next step intent for the one or more ongoing tasks based at least in part on historical user data. Even more particularly, the computing system can select one or more content intent at least in part based on the hierarchical representation of the next step intent. As an example, determined or predicted user preferences can determine hierarchical representation of the next step intent (e.g., common product attributes across all products explored, brand affinity, etc.).

In some implementations, the suggested content item for each of the one or more next step intent within an ongoing task can be ranked. In particular, the suggested content item for each of the one or more next step intent within an ongoing task can be ranked based on at least one quality attribute. Even more particularly, the quality can be one or more of other user engagement levels (e.g., percentage of other users that interact with the suggested content item when presented as an option), reviews (e.g., comments on an article that can be provided as suggested content), freshness (e.g., how new or old an article is) or content relevancy (e.g., headphone buying guide as opposed to gaming computer review).

In some implementations, surfacing for display to the user a selectable action element for at least one ongoing task comprises the selectable element surfacing on a dedicated dashboard. For instance, the dedicated dashboard may be configured to display multiple ongoing tasks. For instance, multiple ongoing tasks may be delineated under headings denoting the user's explicit task unit (e.g., "headphone shopping") such that a user can interact with one of the multiple ongoing tasks to move to another interface that allows the user to interact with the particular ongoing task with greater granularity.

Interacting with a particular ongoing task with greater granularity can allow a user to have a much more detailed influence on the content surfaced by the computing system as well as expand the breadth of what suggestions a user can view. For instance, current suggestions as well as previewing implicit task units such as suggested next steps can be seen. Products can be tracked and viewed as well as interacting with the tracked products in ways such as turning on or off alerts for tracked products. A user can indicate by interfacing with a particular surfaced content whether the content is accurate in predicting useful content or if the user is not interested (e.g., if the user indicates a lack of interest the particular surfaced content can be reranked and an alternative content can be surfaced instead). Another way that a user can interact more deeply with a particular ongoing task is interacting with a timeline of content the user has interacted with during the duration of pursuing the particular ongoing task.

The dedicated dashboard can present the selectable action elements indicating suggest content items in a variety of ways. For example, selectable action elements could be presented on a carousel (e.g., suggested movies to view), as a preview of the suggested web page (e.g., headphone buying guide), a notification of a price drop of an item previously viewed (e.g., a sale on a brand of headphones) etc. Furthermore, the ranking of the suggested content items can determine how the action element for the particular suggested content item is presented. For instance, a suggested content item that is ranked higher than a particular threshold can be presented in a larger icon (e.g., with imagery depicting the content) while a suggested content item that is ranked lower than a particular threshold can be presented in a smaller icon (e.g., underneath the higher ranked content, only words, etc.). Even more particularly, badges can overlay on selectable action elements alerting the user to pertinent information (e.g., streaming service providing suggested movie, when the user last viewed content, etc.).

In some implementations, surfacing for display to a user a selectable action element for at least one ongoing task includes obtaining a current user web browser data. The current user web browser data can include one or more of a textual content or an image content. One or more ongoing tasks from the historical user data can be identified based at least in part on the one or more textual content or the image content. Particularly, identifying one or more ongoing tasks from the historical user data can be based at least in part on semantically analyzing textual content. Even more particularly, the content type can be determined based at least in part on the semantically analyzed textual content of the current user web browser data. Furthermore, identifying one or more ongoing tasks from the historical user data can be based at least in part on identifying one or more compositional characteristics of the image. Even more particularly, the content type can be determined based at least in part on the one or more compositional characteristics of the image of the current user web browser data. Continuing the example from above, if a user was currently browsing an article on earbuds, the computing system can surface a selectable action element suggesting an article related to purchasing a set of headphones based at least in part on the work "earbud" appearing in the article or an image of earbuds appearing in the article.

Thus, the present disclosure provides a computing system and method that can be used to surface a selectable action element for at least one ongoing task, for example, an action element configured to provide access to at least one suggested content item. In particular, the present disclosure provides a general pipeline to identify potential tasks that a user has an ongoing interest in or has not yet completed so that a suggestion of a content item can be made to further advance an identified user's task. This pipeline incorporates hierarchical graphs, machine-learned models, and historical data to determine the relevance and completion of tasks that a user may desire to continue acting upon and surfacing a selectable action element in various interfaces.

The systems and methods of the present disclosure provide a number of technical effects and benefits. As one example technical effect, the proposed techniques are able to provide users with an immersive and helpful experience of predicting the next step in a task the user is attempting to complete or continue engaging in. In particular, providing helpful suggestions with regard to tasks is able to greatly overcome user frustration as many users engage in long term tasks involving a plurality of searches without an ability to leverage the previous work done in an effective and productive way by filtering through the noise. Contrary to only predicting what a user may be searching based on initial textual query inputting, the present disclosure illustrates a way to directly provide the results of historical searches to more efficiently provide the content that is most helpful to the user. Furthermore, the present disclosure allows for the user to be able to more fully leverage historical content effectively and in combination with their future content to accomplish completion of initiated tasks in a way that only predicting searches based on initial input cannot. In particular, the proposed techniques reduce redundant work or fruitless searches, thereby saving computational resources (e.g., processor usage, memory usage, network bandwidth, etc.) as well as user time and frustration. Specifically, by surfacing relevant content for ongoing tasks, a total number of searches needed to perform the task can be reduced, which can result in savings of computational resources such as those described above. Furthermore, the proposed technique surfaces content more tailored to a user that may not have been surfaced based on general searches the user could have input, thus reducing pointless content consumption.

With reference now to the Figures, example embodiments of the present disclosure will be discussed in further detail.

Example Devices and Systems

FIG. 1 depicts a block diagram of an example computing system 100 that performs personalized and/or intelligent searches in response to at least in part visual queries according to example embodiments of the present disclosure. The computing system 100 includes a user computing device 102 and a web server 104 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.). and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the web browser application 124 of a user computing device 102 retrieves content related to objects referred to in the user input component 122 of the user computing device 102. For example, the web browser can retrieve content related to a web page requested by the user and then display the page to a user interface 158 of the device 102.

Although the web browser application 124 is shown in FIG. 1 as being included in the device 102, in other implementations some or all of the functionality of the web browser application 124 can be implemented at the web server 104.

The web server 104 includes one or more front-end servers 136 and one or more back-end servers 140. The front-end servers 136 can receive user input components 122 from user computing devices, e.g., the user computing device 102 (e.g., from the web browser 124). The front-end servers 136 can provide the image data to the back-end servers 140. The back-end servers 140 can identify content related to objects recognized in the user input data and provide the content to the front-end servers 136. In turn, the front-end servers 136 can provide the content to the mobile device from which the image data was received.

The back-end servers 140 includes one or more processor(s) 142 and a memory 146. The one or more processor(s) 142 can be any suitable processing device (e.g., a processor core, a microprocessor, an ASIC, a FPGA, a controller, a microcontroller, etc.). and can be one processor or a plurality of processors that are operatively connected. The memory 146 can include one or more non-transitory computer-readable storage mediums, such as RAM, ROM, EEPROM, EPROM, flash memory devices, magnetic disks, etc., and combinations thereof. The memory 146 can store data 148 and instructions 150 which are executed by the processor(s) 142 to cause the web server 104 to perform operations. The back-end servers 140 can also include a query processing system 152.

Alternatively, the back-end servers 140 may not have access to a preexisting file to provide to the front-end servers 136. Thus, a file can be generated at the time of the request by another program that provides content 160 that communicates with the web server 104. In turn, the web server 104 and the front-end servers 136 can provide the content to the mobile device from which the image data was received.

In some implementations, the web server 104 includes or is otherwise implemented by one or more server computing devices. In instances in which the web server 104 includes plural server computing devices, such server computing devices can operate according to sequential computing architectures, parallel computing architectures, or some combination thereof.

In some implementations, the query processing system 152 includes multiple processing systems. One example system can allow the system to identify a plurality of candidate search results. For instance, the system can identify a plurality of candidate search results upon first receiving user input components. On the other hand, the system can identify a plurality of search results after further processing by the system has already been done. Specifically, the system can identify a plurality of search results based on a more targeted query that the system has generated. Even more particularly, a system can generate a plurality of candidate search results when the system first receives user input components and then regenerate a plurality of candidate search results after further processing, based on a more targeted query that the system has generated.

After the content is selected, the content can be provided to the user computing device 102 from which the user input components were received, stored in a content cache 138 of the web server 104, and/or stored at the top of a memory stack of the front-end servers 136. In this way, the content can be quickly presented to the user in response to the user requesting the content. If the content is provided to the user computing device 102, the web browser 124 can store the content in a content cache 134 or other fast access memory. For example, the web browser 124 can store the content for an object with a reference to the object so that the web browser 124 can identify the appropriate content for the object in response to determining to present the content for the object.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other different distributions of components can be used as well. For example, some or all of the various aspects of the visual search system can instead be located and/or implemented at the user computing device 102.

Figure 2:
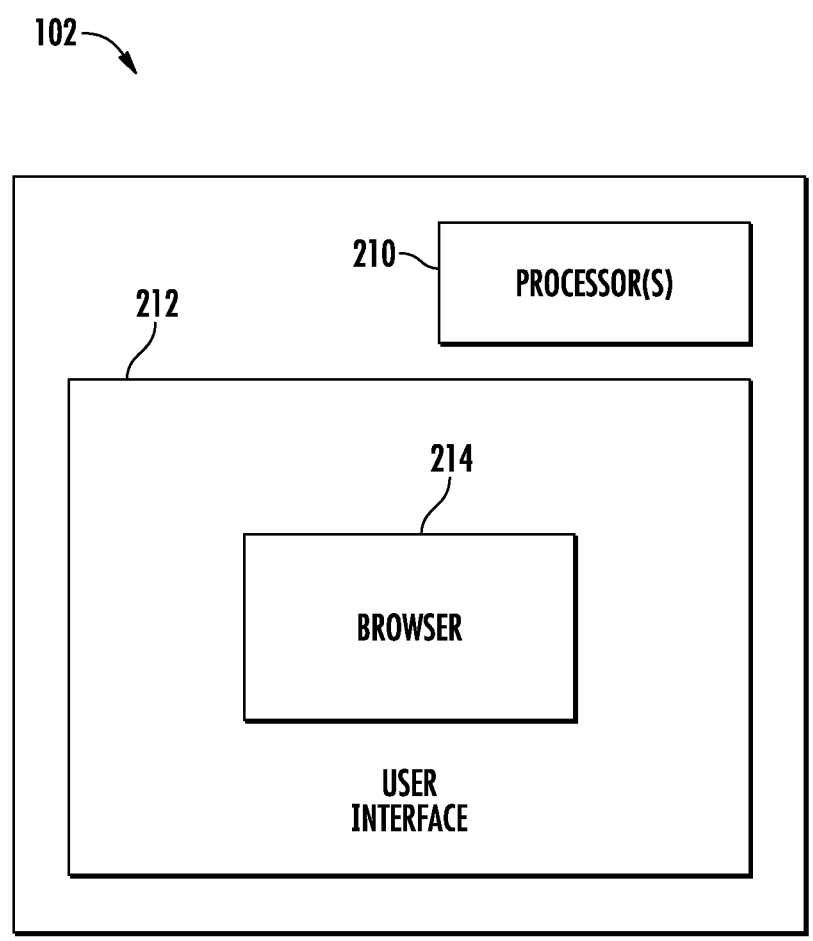
FIG. 2 illustrates an exemplary client device including one or more processors and a user interface.

FIG. 2 illustrates an exemplary client device 102 including one or more processors 210 and a user interface 212. Client 102 can be, for example, a personal computer, a laptop computer, a personal handheld device, a mobile telephone, a game console, a set-top box, an embedded system, etc., but is not to be limited to these devices. Client 102 can include any computing device that can request web content from a web content server such as server 104.

Client 102 includes a user interface 212 that can include various types of inputs and outputs that allow a user to interact with client 102. Example inputs can include, but are not limited to, a mouse, a keyboard, a keypad, a touchscreen, a microphone, etc. Example outputs can include, but are not limited to, a display for visual output, a speaker for audible output, etc. Many, if not all, of the above interface examples are driven, supported, or enhanced by hardware, firmware, and/or software located or running within client 102. For the viewing of web content, for example, user interface 212 can include a web browser 214. Browser 214 includes software running on client 102 that allows a user to request and view web content (i.e., content that can be provided from a server, such as server 104, connected to client 102 via one or more networks (e.g., the Internet or World Wide Web). Examples of browsers 214 include, but are not limited to, Chrome by Google™ Inc., Internet Explorer® by Microsoft®, Firefox® by Mozilla® Corporation, Safari® by Apple® Inc., Opera© by Opera Software™ ASA, etc.

Figure 3:
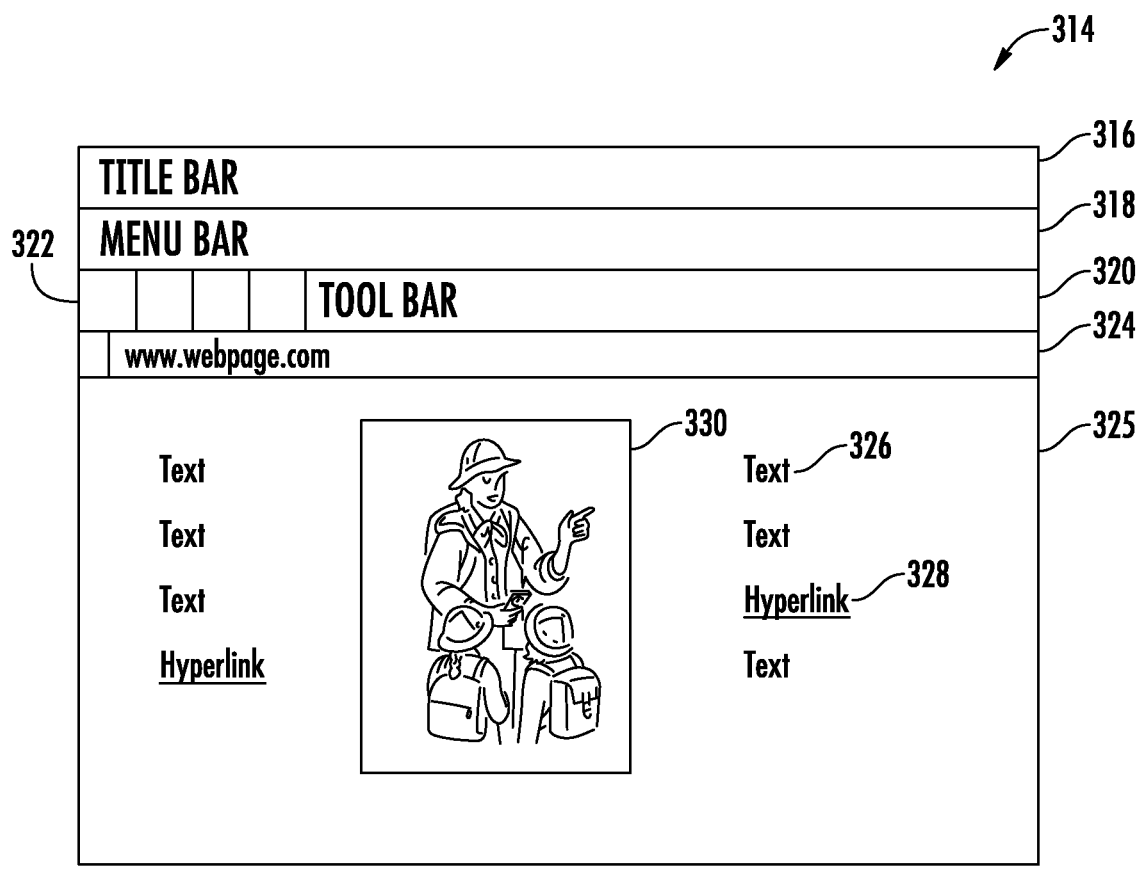
FIG. 3 illustrates exemplary web content displayed in a browser window in a user interface of a client device.

FIG. 3 illustrates an exemplary browser window 314 as displayed to a user of a client device 102. A typical browser window 314 can include a title bar 316, a menu bar 318, a tool bar 320, a URL (Uniform Resource Locator) field 324, and a body 325. Title bar 316 can contain the title that the designer of the web page named the web page being viewed. Menu bar 318 can contain various drop-down menus that include tools and options related to the web page being viewed. Tool bar 320 can contain various buttons 322 representative of tools and options related to the presently viewed web page and/or navigation to other web pages. URL field 324 can contain the address of the web page being viewed and may allow a user to type in an address of another web page to be viewed. Body 325 can contain the content of the web page, including, for example, text 326 and images 330. Text in body 325 can also be representative of a hyperlink 328 that is typically highlighted and/or underlined to be distinguishable from general text. If a user selects, or clicks on, a hyperlink 328, a new web page can appear, for example in place of, or in addition to, the currently viewed web page that relates to the text shown in hyperlink 328.

When a user opts to view a web page, for example by entering an address in the URL field in a browser window such as browser window 314, clicking on a hyperlink (in a currently viewed web page, an email, an electronic document, etc.), or using the menu bar 318 or tool bar 320, or opts to view specific web content on a web page (e.g., a new view of an image), a request for the corresponding web content is sent over one or more networks 106 to the appropriate web content server I 04. Server 104 retrieves or fetches the requested web content, from database 108 for example, and serves it (sends it) to the requesting client device 102. Client device 102 receives the requested web content and renders it for display in, for example, browser window 314.

Example Model Arrangements

Figure 4:
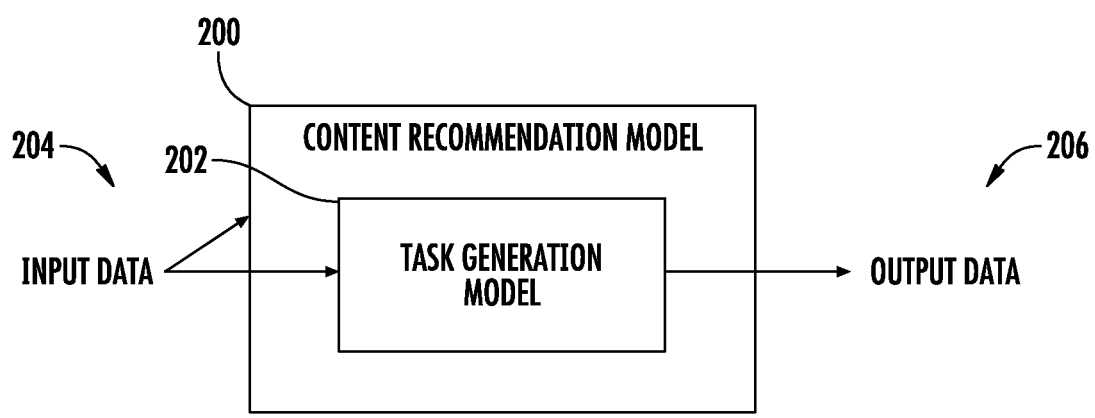
FIG. 4 depicts a block diagram of an example content recommendation model according to example embodiments of the present disclosure.

FIG. 4 depicts a block diagram of an example content recommendation model 200 according to example embodiments of the present disclosure. In some implementations, the content recommendation model 200 is trained to receive a set of input data 204 descriptive of a historical user data and, as a result of receipt of the input data 204, provide output data 206 that identifies content that the machine-learned model presents as recommended to a user to accomplish a predicted next step in an identified task. Thus, in some implementations, the task generation model 200 can include a task generation model 202 that is operable to generate one or more tasks that the user is currently engaging in.

In particular, task generation model 202 can leverage the input data 204 to determine a current task based on historical user actions determined from historical user data. For instance, the task generation model can generate annotations for historical user data (e.g., based on metadata associated with the historical user data). Based on the annotations associated with the historical user data, the task generation model 202 can generate one or more predicted tasks a user may be engaging in. Even more particularly, the content recommendation model can leverage input data 204 in combination with the one or more predicted tasks a user may be engaging in generated by task generation model 202, to generate output data 206, in particular, one or more pieces of content predicted to accomplish the next step in the predicted task a user may be engaging in.

Example Methods

Figure 9:
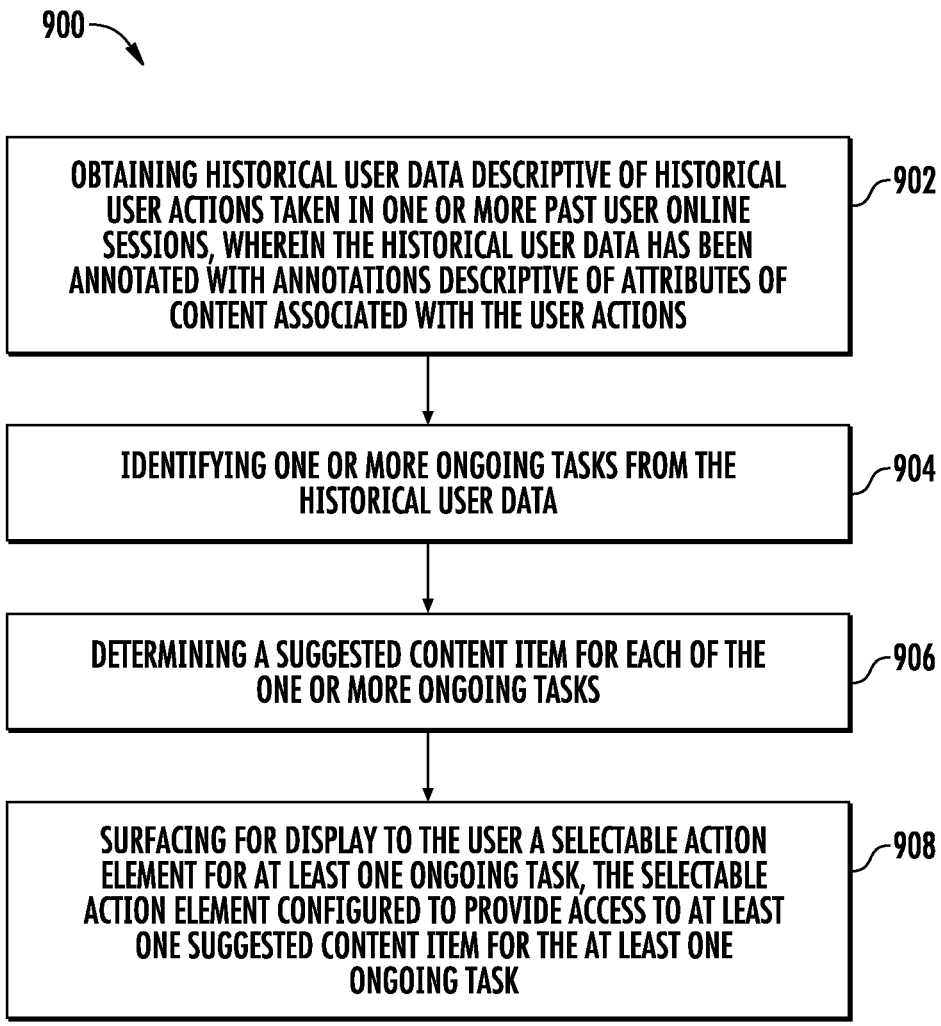
FIG. 9 depicts a flow chart diagram of an example method to perform generation of action elements suggesting content for ongoing tasks according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can obtain historical user data descriptive of historical user actions taken in one or more past user online sessions. In particular, the historical user data descriptive of historical user actions can be annotated with annotations descriptive of attributes of content associated with the user actions.

At 904, the computing system can identify one or more ongoing tasks from the historical user data.

At 906, the computing system can determine a suggested content item for each of the one or more ongoing tasks.

At 908, the computing system can surface for display to the user a selectable action element for at least one ongoing task. In particular, the selectable action element can be configured to provide access to at least one suggested content item for the at least one outgoing task.

Example Applications

Figure 5:
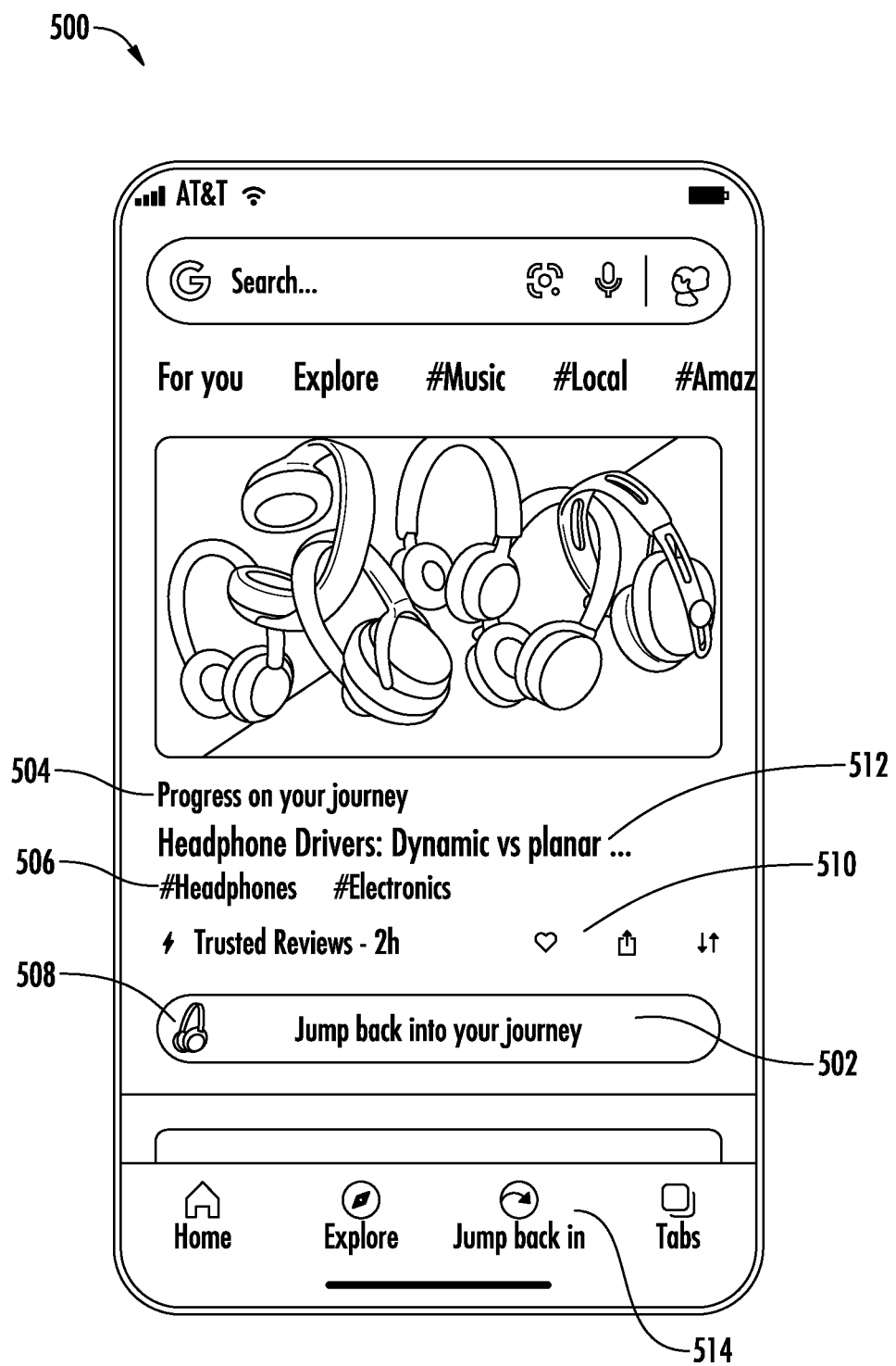
FIG. 5 illustrates an example user interface illustrating how an action element can be presented to a user according to example embodiments of the present disclosure.

FIG. 5 illustrates a first exemplary application of the method disclosed in FIG. 9. 500 illustrates an exemplary user interface wherein a user can engage in continuing a predicted task. For instance, the user can engage in continuing a predicted task (e.g., prompting a task specific dashboard of predicted content) by interacting with (e.g., touch, select, toggle, etc.) a selectable action element 502. In particular, the selectable action element 502 can include an icon 508 symbolizing the predicted task. For example, the selectable action element 502 can include an icon 508 of a set of headphones if the predicted task is purchasing a set of headphones. The user interface 500 can additionally include at least one piece of content 512 directly recommended to a user. In particular, the user can interact with the at least one piece of content directly recommended 512 without engaging in the selectable action element 502. For example, the user can engage directly in the directly recommended piece of content 512 without prompting a task specific dashboard of predicted content by interacting with the selectable action element 502. The user interface 500 can include an overlay 504 describing how the directly recommended piece of content 512 may impact the predicted task. Additionally, the user interface 500 can include tags 506 describing key words associated with the predicted task. Additionally, the user interface 500 can include a favorites toggle 510 wherein the user can engage with the favorites toggle 510 to indicate that the user likes the directly recommended piece of content 512. The computing system can save the directly recommended piece of content 512 in another recoverable location if the user activates the favorites toggle 510. The computing system can additionally have a button 514 which the user can interact with to initiate an immersive dashboard relating to predicted tasks.

Figure 6:
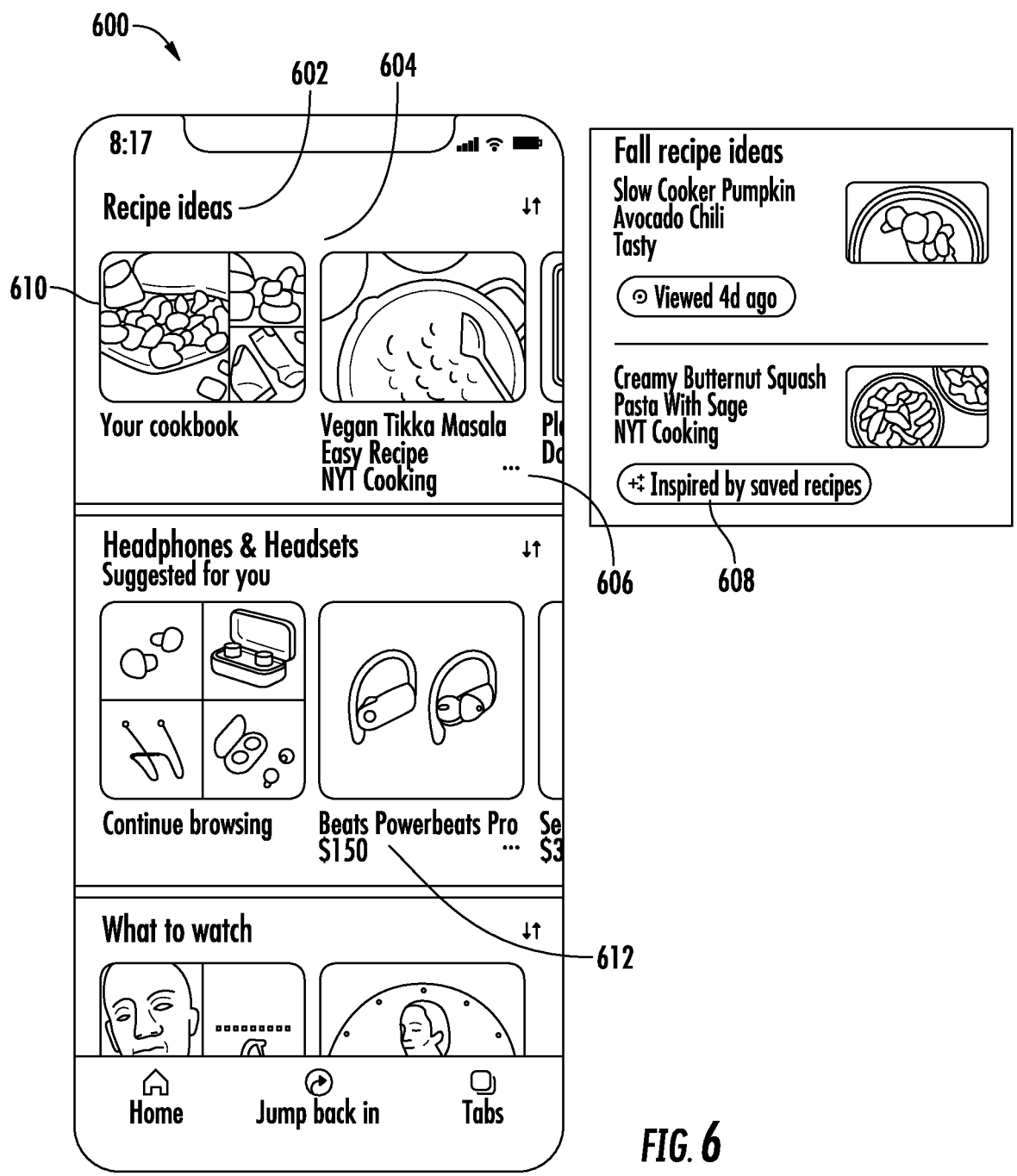
FIG. 6 illustrates an example user interface illustrating how a specialized dashboard can be leveraged to present multiple ongoing tasks with associated action elements to a user according to example embodiments of the present disclosure.

FIG. 6 illustrates another exemplary application of the method disclosed in FIG. 9. 600 illustrates an exemplary immersive dashboard user interface wherein a user can engage in continuing more than one predicted task. For instance, the dashboard can indicate with textual headers 602 more than one predicted task such that a user can browse which task the user wishes to continue. The predicted task can include panels 610 on a carousel feature 604 indicating predicted next steps for a user engaging in that task. For instance, the panels 610 on the carousel feature 604 can include a feature for the user to continue browsing options. The panels 610 on the carousel feature 604 can include predicted items of interest. The panels 610 on the carousel feature 604 can include user saved content. In particular, as an example, a predicted task can be cooking. Thus, as a further example, the panels 610 on the carousel feature 604 indicating predicted items of interest can include predicted recipes of interest. As a further example if the predicted task is purchasing headphones, the panels 610 on the carousel feature 604 indicating predicted items of interest can include headphones or earbuds on sale. The panels 610 can include an informational overlay 612. The informational overlay 612 can indicate information relating to the content associated with the panel 610. For instance, the informational overlay 612 can indicate a price or source of the piece of content associated with the panel 610. The user can indicate a desire to see more detailed suggestions relating to the task by interacting with a detail icon 606. Upon interacting with the detail icon 606 the user can view additional content related to the task. Upon interacting with the detail icon 606 the user can engage a further dashboard displaying additional content related to one particular task. The additional content can have an information overlay 608 indicating a reason the computing system has surfaced the particular piece of content. For example, a piece of content can have an information overlay 608 indicating that the piece of content was viewed by the user in the past (e.g., "viewed four days ago"), or the piece of content has similar features to content saved by the user or previously viewed by the user (e.g., "inspired by saved content").

Figure 7:
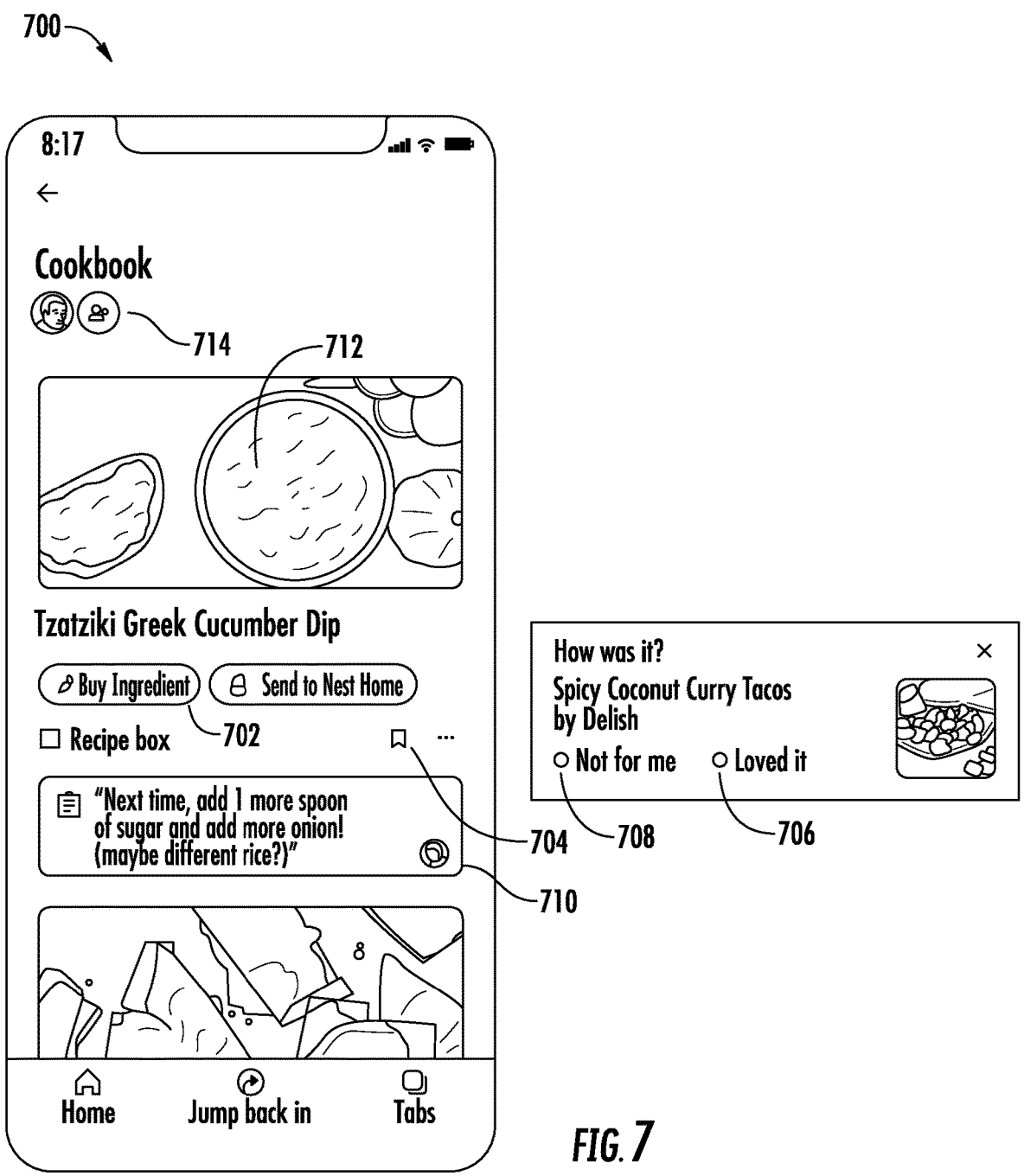
FIG. 7 illustrates an example user interface illustrating how a user can interact with a specific continuous ongoing task according to example embodiments of the present disclosure.

FIG. 7 illustrates another exemplary application of the method disclosed in FIG. 9. 700 illustrates an exemplary immersive dashboard user interface wherein a user can engage in continuing a particular predicted task. In particular, 700 illustrates how an immersive dashboard associated with a particular predicted task can allow a user to pursue a particular task with increased specificity. For example, a card 712 can indicate a predicted piece of content relating to the particular task. In particular, specified action elements 702 can be surfaced such that a user can interact with the specified action elements 702 to trigger predicted actions tailored to the particular predicted piece of content in combination with the particular task. For instance, the specified action element 702 can connect the predicted piece of content with other features of a smart home (e.g., Nest, Echo, etc.) As a further example, for a card 712 suggesting a recipe, the specified action elements 702 can include actions that the user can engage in such as buying the ingredients. Card 712 can also have a bookmark feature 704 so that a user can indicate that they wish to revisit the piece of content associated with the card 712. In some instances, an overlay can appear on the interface prompting a user to indicate their feedback in response to a predicted piece of content. For instance, a user can interface with an affirmative icon 706 or a negative icon 708 on the overlay to indicate their feedback with regard to the indicated piece of content. Furthermore, the user can insert a note 710 associated with particular pieces of content wherein the note can contain a user written memo with regard to the associated piece of content. The immersive dashboard user interface 700 can additionally incorporate a share icon 714 wherein a user can share the task with another user. The second user can be a passive observer of the task as it progresses or can be added as an active contributor. In the case of more than one user contributing to a particular task, certain predictions can be attributed to a particular user and a representation of the particular user (e.g., an image, symbol, name, etc.) can be leveraged to indicate which user a particular prediction is attributed to.

Figure 8:
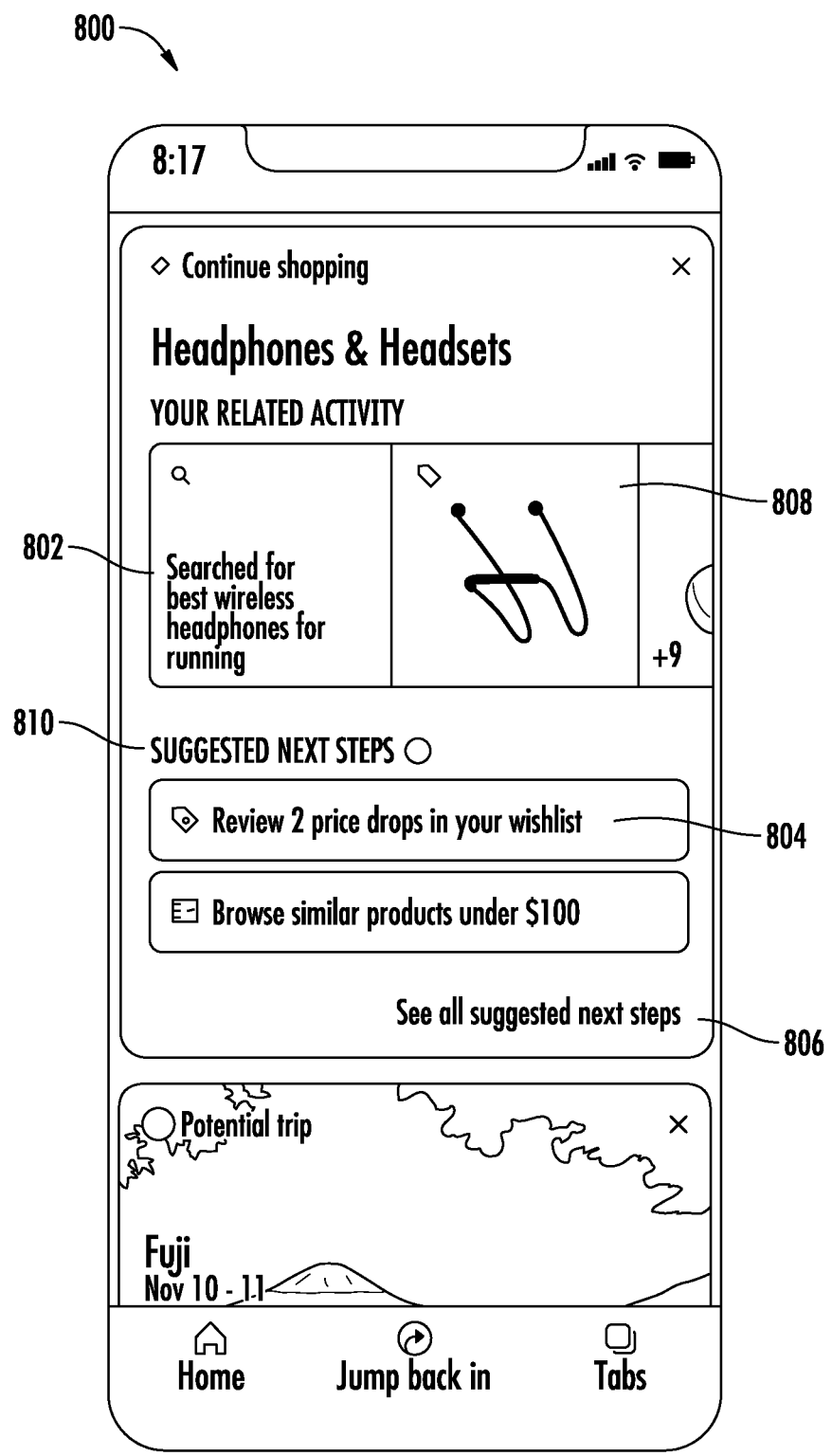
FIG. 8 illustrates an example user interface illustrating how a user can interact with a specific discrete ongoing task according to example embodiments of the present disclosure.

FIG. 8 illustrates another exemplary application of the method disclosed in FIG. 9. 800 illustrates another exemplary immersive dashboard user interface wherein a user can engage in continuing a particular predicted task. In particular, 800 further illustrates how an immersive dashboard associated with a particular predicted task can allow a user to pursue a particular task with increased specificity. For example, the immersive dashboard 800 can include a related activity search 802 wherein the related activity search 802 can surface what keywords were included in the search. In some instances, the keywords included in the search can be hyperlinked such that interacting with them initiates the full search for the user. Alternatively, results from the related activity search 802 can be displayed in result panels 808 alongside the related activity search 802. The result panels 808 can be displayed in a carousel fashion. The immersive dashboard user interface 800 can include a step counter 810 indicating the number of next steps that the computing system has predicted. The number of next steps indicated on the step counter 810 can be the number of most highly suggested steps (e.g., steps above a particular confidence threshold) Furthermore, the predicted steps can be indicated in step summary panels 804, wherein the step summary panels 804 can be hyperlinked such that the user can interact with the step summary panels 804 to initiate the associated step. As an example, a predicted step can be reviewing price drops for items the user has indicated an interest in (e.g., by viewing them in the past, indicating as a favorite, adding to a wish list, bookmarking, etc.). Another predicted step could be browsing similar products (e.g., browsing similar products under a certain cost). The immersive dashboard 800 can additionally include a user interfacing prompt 806. The user interfacing prompt 806 can allow a user to interact with it to surface even more detailed predictions output by the computing system. As an example, the user interfacing prompt 806 can be associated with the step counter 810 and step summary panels 804 such that a user can select the user interfacing prompt to view all predicted next steps as opposed to only the most highly suggested next steps selected by the computing system.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for task-specific action element generation, the method comprising:
    obtaining, by a computing system, historical user data descriptive of historical user actions taken in one or more past user online sessions, wherein the historical user data has been annotated with annotations descriptive of attributes of content associated with the user actions;
    identifying, by the computing system, one or more tasks from the historical user data, wherein at least one task in the one or more tasks are ongoing;
    generating, by the computing system, a list of one or more ongoing tasks by determining, for each respective task in the one or more tasks, whether the respective task is ongoing or completed;
    for a respective ongoing task in the one or more ongoing tasks:
        accessing, by the computing system, a continually updated probabilistic transition graph for the respective task; and
        identifying, by the computing system, a next step intent for the respective task based at least in part on the continually updated probabilistic transition graph;
    determining, by the computing system, a suggested content item for at least the respective ongoing task based on the next step intent; and
    surfacing for display to the user, by the computing system, a selectable action element for at least the respective ongoing task, the selectable action element configured to provide access to at least one suggested content item for at least the respective ongoing task.

2. The computer-implemented method of claim 1, wherein obtaining, by the computing system, the historical user data descriptive of the historical user actions comprises:
    extracting, by the computing system, the historical user actions from a plurality of web pages across multiple web browser sessions.

3. The computer-implemented method of claim 1, wherein identifying, by the computing system, the one or more tasks from the historical user data comprises:
    annotating, by the computing system, the historical user data with the annotations descriptive of the attributes of the content associated with the user actions;
    clustering, by the computing system, the annotated historical user data into a plurality of clusters; and
    identifying one or more tasks from the historical user data based at least in part on the plurality of clusters.

4. The computer-implemented method of claim 1, wherein identifying, by the computing system, the one or more tasks from the historical user data comprises:
    processing, by the computing system, the historical user data with a machine learned model; and
    generating, by the machine learned model, the one or more tasks from the historical user data.

5. The computer-implemented method of claim 1, wherein identifying, by the computing system, the one or more tasks from the historical user data is based at least in part on a relevance score, wherein identifying one or more tasks from the historical user data comprises:
    weighting content comprising a higher relevance score more heavily than content with a lower relevance score.

6. The computer-implemented method of claim 5, wherein the relevance score is based at least in part on a timestamp associated with the historical user data.

7. The computer-implemented method of claim 1, wherein determining, for each respective task in the one more or tasks, whether the respective task is ongoing or completed further comprises:
    generating, by the computing system, a probability distribution, wherein the probability distribution comprises a set of intents based at least in part on aggregate historical user data of a plurality of users; and
    identifying, by the computing system, a suggested next step based at least in part on a completion metric, wherein the completion metric indicates a user's status with regard to completing predetermined checkpoints associated with the one or more ongoing tasks, wherein the checkpoints indicate information the user has consumed.

8. The computer-implemented method of claim 7, wherein the completion metric is based at least in part on a URL associated with at least one predetermined checkpoint associated with the one or more ongoing tasks.

9. The computer-implemented method of claim 1, wherein:
    the probabilistic transition graph comprises a hierarchical representation of the next step intent for the one or more ongoing tasks based at least in part on historical user data; and
    identifying, by the computing system, the next step intent for the respective ongoing task comprises selecting, by the computing system, one or more content intents based at least in part on the hierarchical representation of the next step intent.

10. The computer-implemented method of claim 1, wherein determining, by the computing system, the suggested content item for for at least the respective ongoing task based on the next step intent comprises ranking, by the computing system, the suggested content item for the respective ongoing task based on at least one quality attribute.

11. The computer-implemented method of claim 10, wherein the quality attribute comprises one or more of the following:
    other user engagement levels;
    reviews;
    freshness; or
    content relevancy.

12. The computer-implemented method of claim 1, wherein surfacing for display to the user, by the computing system, the selectable action element for at least the respective ongoing task comprises surfacing, by the computing system, the selectable action element on a dedicated dashboard.

13. The computer-implemented method of claim 1, wherein surfacing for display to the user, by the computing system, the selectable action element for at least the respective ongoing task comprises:

obtaining, by the computing system, current user web browser data, wherein the current user web browser data comprises one or more of textual content or image content currently being presented to the user;

selecting, by the computing system, the respective ongoing task from the historical user data based at least in part on the one or more textual content or the image content;

surfacing for display to the user, by the computing system, the selectable action element for the respective ongoing task overlayed on or adjacent to the current user web browser data.

14. The computer-implemented method of claim 13, wherein selecting, by the computing system, the respective ongoing task from the historical user data based at least in part on the one or more of the textual content or the image content comprises:

semantically analyzing, by the computing system, the textual content of the current user web browser data; and determining, by the computing system, a content type based at least in part on the semantic analysis of the textual content of the current user web browser data.

15. The computer-implemented method of claim 13, wherein selecting, by the computing system, the respective ongoing task from the historical user data based at least in part on the one or more of the textual content or the image content comprises:

identifying, by the computing system, one or more compositional characteristics of the image content of the current user web browser data; and determining, by the computing system, a content type based at least in part on the one or more compositional characteristics of the image content of the current user web browser data.

16. A computing system, comprising:
one or more processors; and
non-transitory computer readable storage medium storing instructions executable by the one or more processors and that upon such execution cause the computing system to perform operations, the operations comprising:

obtaining, by the computing system, historical user data descriptive of historical user actions taken in one or more past user online sessions, wherein the historical user data has been annotated with annotations descriptive of attributes of content associated with the user actions;

identifying, by the computing system, one or more tasks from the historical user data, wherein at least one task in the one or more tasks are ongoing;

generating, by the computing system, a list of one or more ongoing tasks by determining, for each respective task in the one or more tasks, whether the respective task is ongoing or completed;

for a respective ongoing task in the one or more ongoing tasks:
accessing, by the computing system, a continually updated probabilistic transition graph for the respective task; and identifying, by the computing system, a next step intent for the respective task based at least in part on the continually updated probabilistic transition graph;

determining, by the computing system, a suggested content item for at least the respective ongoing task based on the next step intent; and surfacing for display to the user, by the computing system, a selectable action element for at least the respective ongoing task, the selectable action element configured to provide access to at least one suggested content item for at least the respective ongoing task.

17. The computing system of claim 16, wherein identifying, by the computing system, one or more tasks from the historical user data comprises:

annotating the historical user data descriptive of attributes of content associated with the user actions;

arranging the annotated historical user data into a plurality of clusters;

identifying one or more tasks from the historical user data based at least in part on the plurality of clusters.

18. The computing system of claim 16, wherein identifying, by the computing system, one or more ongoing tasks from the historical user data comprises:

inputting the historical user data into a machine learned model; and generating, by the machine learned model, one or more tasks from the historical user data.

19. A non-transitory computer readable storage medium storing instructions executable by a computing system and that upon such execution cause the computing system to perform operations comprising:

obtaining, by the computing system, historical user data descriptive of historical user actions taken in one or more past user online sessions, wherein the historical user data has been annotated with annotations descriptive of attributes of content associated with the user actions;

identifying, by the computing system, one or more ongoing tasks from the historical user data, wherein at least one task in the one or more tasks are ongoing;

generating, by the computing system, a list of one or more ongoing tasks by determining, for each respective task in the one more or tasks, whether the respective task is ongoing or completed;

for a respective ongoing task in the one or more ongoing tasks:
accessing, by the computing system, a continually updated probabilistic transition graph for the respective task; and identifying, by the computing system, a next step intent for the respective task based at least in part on the continually updated probabilistic transition graph;

determining, by the computing system, a suggested content item for at least the respective ongoing task based on the next step intent; and surfacing for display to the user, by the computing system, a selectable action element for at least the respective ongoing task, the selectable action element configured to provide access to at least one suggested content item for at least the respective ongoing task.

* * * * *